United States Patent [19]

Brin et al.

[11] Patent Number: 4,626,142
[45] Date of Patent: Dec. 2, 1986

[54] CLUTCH FOR DRILLING MACHINE

[75] Inventors: Edward Brin, Rolling Meadows; James Mette, Streamwood, both of Ill.

[73] Assignee: Quali-Tech Machine & Engineering Co., Inc., Elk Grove Village, Ill.

[21] Appl. No.: 712,668

[22] Filed: Mar. 18, 1985

[51] Int. Cl.[4] .............................................. B23B 41/08
[52] U.S. Cl. .................................. 408/81; 29/157.1 R; 137/318; 285/15; 408/111; 408/132; 408/140; 464/46
[58] Field of Search ...................... 408/81, 111, 132, 36, 408/42, 126, 129, 133, 134, 137, 140, 139, 121; 464/17, 45, 46, 903; 137/15, 318; 285/15; 188/264 A, 264 R, 251 M; 29/157.1 R

[56] References Cited

U.S. PATENT DOCUMENTS

| | | | |
|---|---|---|---|
| 458,408 | 8/1891 | Schwanhausser | 464/45 X |
| 1,216,284 | 2/1917 | Cash | 408/132 |
| 1,233,344 | 7/1917 | Groff | 408/121 |
| 1,956,129 | 4/1934 | Mueller et al. | 408/132 X |
| 1,996,345 | 4/1935 | Mueller | 29/157.1 R |
| 2,549,702 | 4/1951 | Mueller et al. | 408/81 |
| 2,606,431 | 8/1952 | Elgin | 408/240 X |
| 2,651,222 | 9/1953 | Mueller et al. | 408/111 X |
| 2,857,750 | 10/1958 | Fox | 464/46 X |
| 2,932,193 | 4/1960 | Van Scoy | 408/111 X |
| 2,972,915 | 2/1961 | Milanovits et al. | 137/318 |
| 3,068,725 | 12/1962 | Ver Nooy | 408/81 |
| 3,161,260 | 12/1964 | Benini | 188/264 R X |
| 3,229,711 | 1/1966 | Leopold, Jr. et al. | 29/157.1 R |
| 3,390,750 | 7/1968 | Albertson | 188/251 M X |
| 3,433,339 | 3/1969 | Martin et al. | 188/264 R X |
| 4,028,763 | 6/1977 | Jenner | 408/132 X |
| 4,082,473 | 4/1978 | Bratsos | 408/140 X |

Primary Examiner—Gil Weidenfeld
Assistant Examiner—Glenn Webb
Attorney, Agent, or Firm—Mason, Kolehmainen, Rathburn & Wyss

[57] ABSTRACT

A drilling machine operable by a single operator to tap into a pipeline includes an elongated boring bar to which a number of different tools such as drills and hole saws may be removably attached. The boring bar is positioned within a body tube allowing rotation of the boring bar relative to the body tube. The body tube is positioned within an internally threaded feed tube such that as the feed tube is rotated, the boring bar is advanced. Manual or automatic driving equipment is secured to the boring bar to rotate the tool. A clutch mechanically couples the rotation of the driving equipment to the feed tube to move the tool into the pipeline at a controlled rate. The clutch includes a feed nut threadably secured to the feed tube. Adjacent the feed nut is a clutch member slideably secured to the feed tube. A biasing member such as a wave spring is position between the feed nut and the clutch member. A clutch disc is rigidly secured to the boring bar adjacent the clutch member and a friction disc of organic metal impregnated material is positioned between the clutch disc and clutch member. The clutch disc and clutch member each includes a surface engaging the friction disc. Each of these surfaces is treated to provide high frictional interaction with the friction disc and in the preferred embodiment the surfaces are serrated.

11 Claims, 4 Drawing Figures

FIG. 1
FIG. 2
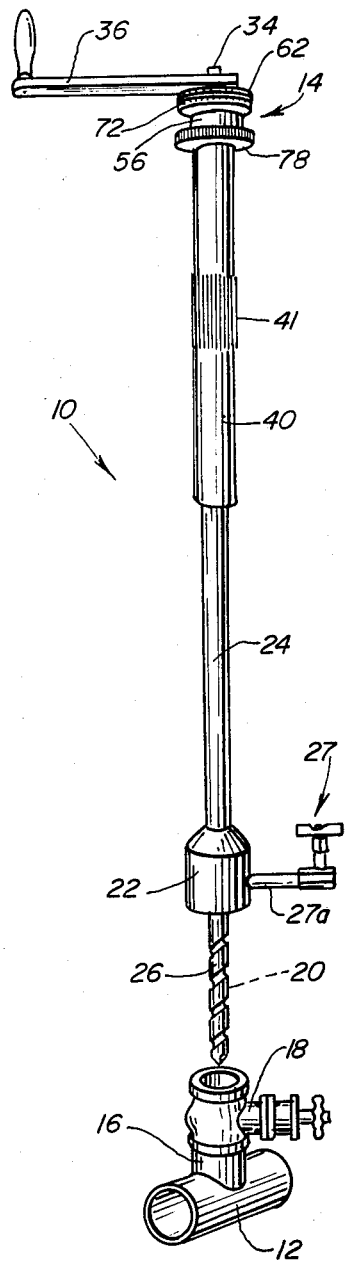
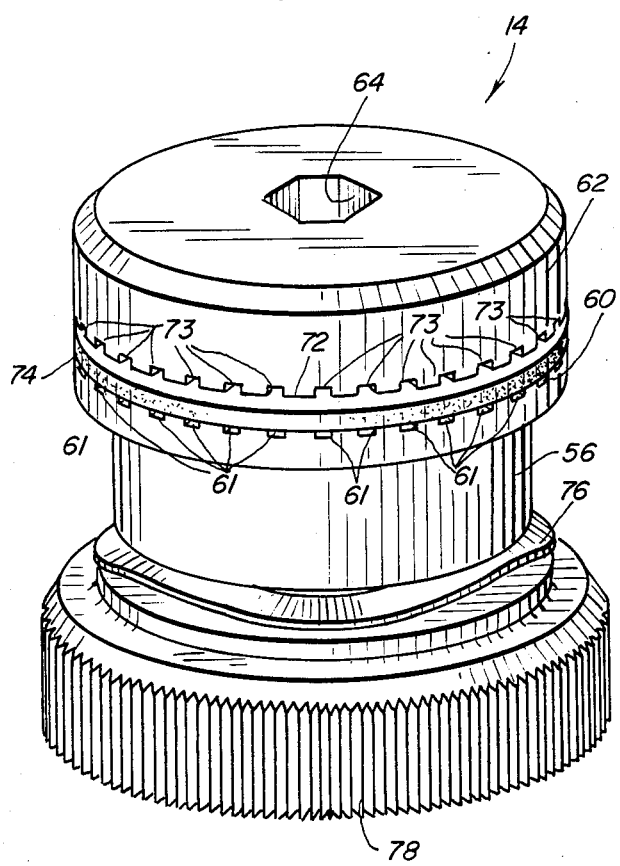

CLUTCH FOR DRILLING MACHINE

BACKGROUND OF THE INVENTION

A. Field of the Invention

The present invention relates to a new and improved drilling machine for tapping high pressure pipeline systems and, more particularly, to a new and improved drilling machine that can be operated at a controlled drilling rate by one person.

B. Description of the Background Art

It is often necessary to tap a high pressure pipeline to provide access for another user. It is preferable in these circumstances to perform the tapping operation without shutdown of the pipeline system.

Tapping of high pressure pipelines is typically accomplished by a drilling machine that is manually operated by a minimum of two people, or operated by a pneumatic drive also requiring two people for operation. Two operators are necessary because two separate operations are performed. The first operation involves rotating a drill. While the drill is being rotated, it must also be advanced through the wall of the pipe at a controlled rate. This requires a second operation involving rotating a feed tube at a different rate of rotation in order to advance the drill into the pipeline.

One existing drilling machine requires an operator to rotate a ratchet crank to rotate the drill while a second operator tightens a friction band type clutch coupling the rotation of the crank to the feed tube. Such a clutch arrangement has the disadvantage that the rotation of the drill must be stopped each time the clutch is adjusted.

Another existing drilling machine employs a clutch defined by a clutch member and a clutch disc with a friction disc between them. The friction disc is fabricated from a graphite impregnated Nylon such as Nylontron and the surfaces of the clutch member and clutch disc abutting the friction disc are smooth. If gas pressure in the pipeline being tapped is high, the pressure makes the drill more difficult to advance, and the smooth surfaces allow slippage preventing advancement of the drill.

SUMMARY OF THE INVENTION

An object of the present invention is to provide a new and improved drilling machine for tapping high pressure pipelines.

Another object of the present invention is to provide a drilling machine with automatic feed requiring only a single person to operate the machine.

A further object of the present invention is to provide a new and improved clutch for drilling machines that allows a single operator to operate the machine.

Briefly, the present invention is directed to a new and improved drilling machine for tapping high pressure pipelines and particularly to a new and improved clutch for a drilling machine that allows automatic feed of the tapping drill into the pipeline. The drilling machine includes an elongated boring bar to which a number of different tools such as drills and hole saws may be removably attached. The boring bar is rotatably positioned within a body tube. The body tube is positioned within an internally threaded feed tube such that as the feed tube rotates, it advances relative to the body tube thereby feeding the drill into the pipeline. The drill may be rotated either manually or by a pneumatic drive system attached to the boring bar. A clutch mechanically couples rotation of the driving equipment to the feed tube to feed the drill into the pipeline at a controlled rate thereby preventing binding. The clutch includes a feed nut threadably secured to the feed tube. Positioned near the feed nut is a clutch member that is secured to the feed tube to allow longitudinal movement relative to the feed tube. A spring is located between the feed nut and the clutch member. A clutch disc is rigidly secured to the boring bar adjacent the clutch member. A friction disc of organic metal impregnated material is positioned between the clutch disc and clutch member. The clutch disc and clutch member each includes a surface engaging the friction disc. Each of these surfaces is treated to provide high frictional interaction with the friction disc. Preferably, these surfaces are serrated.

BRIEF DESCRIPTION OF THE DRAWING

The above and other objects and advantages and novel features of the present invention will become apparent from the following detailed description of a preferred embodiment of the invention illustrated in the accompanying drawing wherein:

FIG. 1 is a perspective view of a drilling machine constructed in accordance with the principles of the present invention and illustrated in position with a pipeline system;

FIG. 2 is an enlarged perspective view of a clutch constructed in accordance with the principles of the present invention to be employed with the drilling machine illustrated in FIG. 1;

DESCRIPTION OF THE PREFERRED EMBODIMENT

Figure 3:
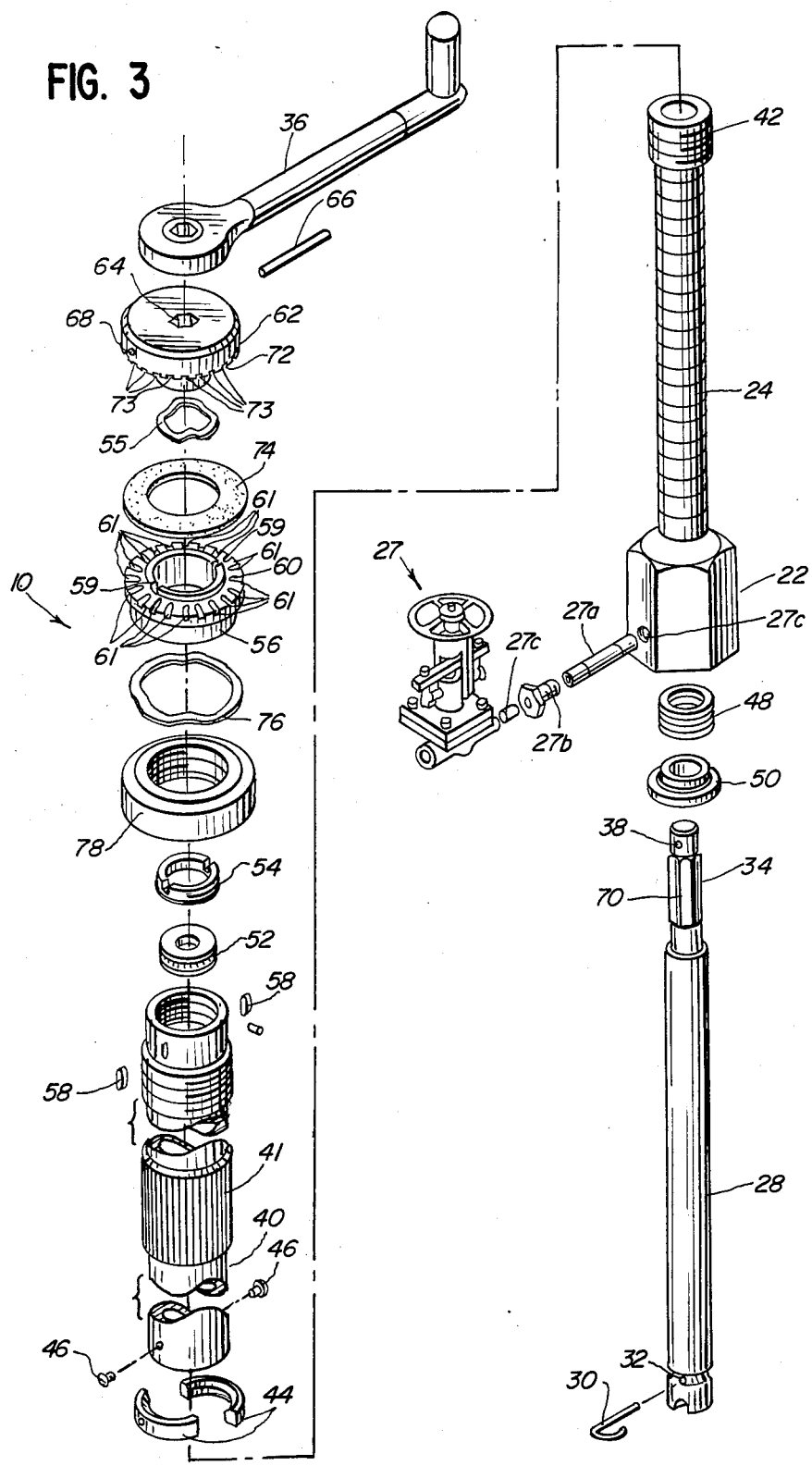
FIG. 3 is an exploded, perspective view of the drilling machine illustrated in FIG. 1.
Figure 4:
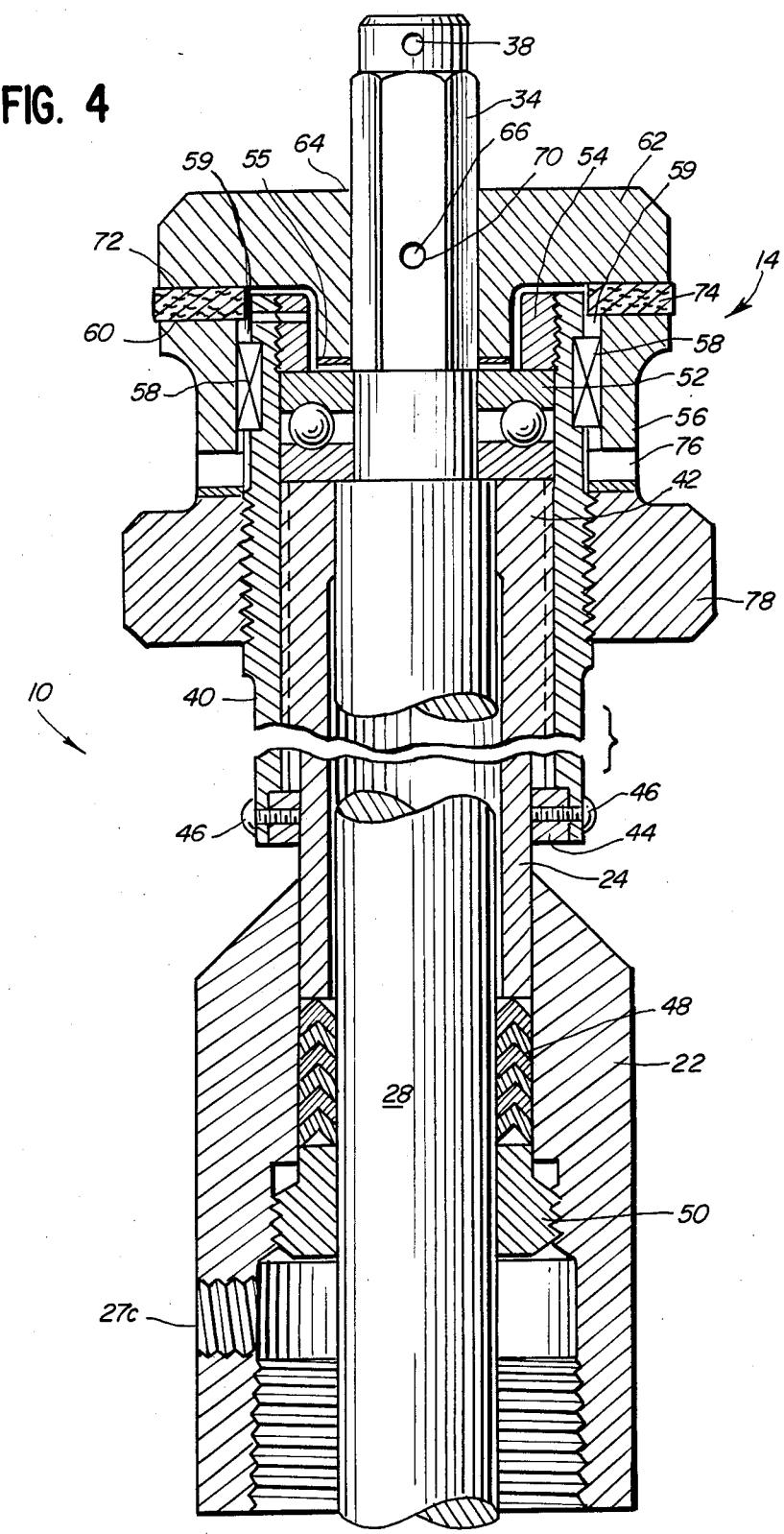
FIG. 4 is an enlarged, cross sectional view of the clutch and drilling machine of the present invention.

Referring to the drawing and initially to FIG. 1, there is illustrated a drilling machine generally designated by the reference numeral 10. The drilling machine 10 is operable by a single operator to tap a high pressure pipeline 12 without shutdown. The drilling machine 10 includes a unique friction type clutch 14 that allows a single operator to operate the drilling machine 10 either manually or with an air drive.

To tap the high pressure pipeline 12, a nipple 16 is welded to the high pressure pipeline 12. A tapping valve 18 is then threadably secured to the nipple 16. The drilling machine 10 includes a body assembly tube 24 with an adapter end 22. An adapter 20 is threadably secured to the tapping valve 18 and to adapter end 22. Once these connections have been made, the valve 18 is opened and the drill 26 is rotated and advanced at a predetermined rate to tap the high pressure pipeline 12. As a safety device and to allow testing, a bleeder valve 27 is mounted in the adapter end 22 by a nipple 27a, a bushing 27b and a pipe plug 27c. These elements secure the bleeder valve 27 in an aperture 27d defined in adapter end 22.

Since the drill 26 must be advanced at a predetermined rate while being rotated, it is necessary with prior drilling machines to have two operators. The clutch 14 of the present invention overcomes the necessity of two operators. To understand the clutch 14 and the unique features of the invention, it is desirable to understand the operation of the drilling machine 10.

The drilling machine 10 includes a boring bar 28 to which the drill 26 is connected at a lower end by a retaining clip 30. The clip 30 extends through an aperture 32 in the boring bar 28 and a corresponding aperture (not shown) in the drill 26. An upper end 34 of the boring bar 28 is multi-sided allowing a rachet handle 36 to be placed over the end 34 to rotate the boring bar 28. The upper end 34 includes an aperture 38 into which a pin (not shown) may be inserted to secure the handle 36 to the boring bar 28. The connections of the handle 36 and the drill 26 to the boring bar 28 allows rotation of the handle 36 to be imparted to the drill 26.

In order to tap the high pressure pipeline 12, the drill 26 must be fed at a predetermined rate into the pipeline 12. This is generally accomplished by rotating a feed assembly at an appropriate rate; however, this rate is different than the rate of rotation of drill 26. Consequently, the feed assembly for the drill 26 cannot be directly coupled to the handle 36. Prior drilling machines allowed different rates of rotation of the drill and feed assembly of the drill by providing a clutch therebetween. These clutches, however, are difficult to operate, and often require an additional operator, thereby substantially increasing the cost of tapping a high pressure pipeline. The drilling machine 10 includes a unique clutch 14 that allows one operator to adjust the feed rate while the rotating drill 26.

The clutch 14 cooperates with a feed tube 40 that feeds the drill 26 into the pipeline 12. The feed tube 40 is internally threaded and an upper end 42 of the body assembly tube 24 is threaded into the feed tube 40. The feed tube 40 may be measurably rotated in order to thread the body assembly tube 24 into the feed tube 40 and advance the drill 26 to a starting position. The feed tube 40 is knurled at 41 to facilitate gripping and manual rotation of the feed tube 40. To hold the lower end of the body assembly tube 24 in alignment within the feed tube 40, a split bushing 44 is secured in the lower end of the feed tube 40 by fasteners 46 to encircle the body assembly tube 24. Alignment and sealing of the boring bar 28 at the lower end is provided by packing 48 and a packing retainer 50. To allow ease of rotation of the boring bar 28 relative to the rest of drilling machine 10, the upper end of the boring bar 28 is positioned within a thrust bearing 52 maintained within the feed tube 40 by a bearing retainer nut 54 and a wave spring 55.

The clutch 14 includes a clutch member or element 56 that is secured to the feed tube 40 by a pair of keys 58 positioned in slots 59 in the clutch member 56. The keys 58 prevent rotation of clutch member 56 relative to feed tube 40 but allow axial movement along the longitudinal axis of drilling machine 10. The clutch member 56 includes a high friction upper surface 60 that is serrated and includes radial cuts 64 of a width of approximately ⅛ inch defining serrations.

The clutch 14 also includes a clutch disc 62 that is rigidly secured to the boring bar 28 by an aperture 64 of a configuration mating with the multisided upper end 34 of the boring bar 28 and by a pin 66 extending through an aperture 68 in the clutch disc 62 and an aperture 70 in the upper end 34. The clutch disc 62 includes a high friction lower surface 72 that is serrated and includes radial cuts 73 of a width of ⅛ inch defining serrations.

A friction disc 74 is positioned between the clutch member 56 and the clutch disc 62 with serrated surfaces 60 and 72 engaging the friction disc 74. The friction disc 74 is fabricated from organic metal impregnated material. Although the clutch disc 62 is rigidly connected to the boring bar 28, the clutch member 56 slides longitudinally relative to the feed tube 40, and a wave spring 76 biases the clutch member 56 into engagement with the friction disc 74. To adjust the compressive pressure on the friction disc 74, there is provided a feed adjustment nut 78 threaded onto the outer periphery of the feed tube 40 at the upper end below the clutch member 56. The outer peripheral surface of the feed nut 78 is knurled to allow easy gripping.

To operate drilling the machine 10, an operator turns the handle 36 rotating the drill 26 at the desired speed. At the same time, the operator may adjust the rate of feed of the drill 26 into the high pressure pipeline 12 by using his free hand to rotate the feed nut 78 to either compress the friction disc 74 or to reduce the compressive force.

Varying the compressive force on the friction disc 74 is often necessary while tapping a high pressure pipeline. For example, pressure in the pipeline 12 may act to oppose the drill 26, and cause the clutch 14 to slip, thereby requiring the compressive force to be increased. If the clutch 14 had been overtightened initially, thus causing the drill to be fed too rapidly, the compressive force would have to be decreased. In the drilling machine 10, such an adjustment is readily provided by adjusting the feed nut 78 to adjust the compressive force between the friction disc 74 and the serrated surfaces 60 and 72, an adjustment that can readily be made by a single operator to control the feed rate of drill 26. The material of friction disc 74 and the serrated surfaces 60 and 72 improve the frictional engagement of the clutch 14 allowing incremental variations of the compressive force while avoiding overtightening.

Many modifications and variations of the invention as hereinbefore set forth can be made without departing from the spirit and scope thereof and only such limitations should be imposed as are indicated by the appended claims.

What is claimed is:

1. In a drilling machine for tapping a pipeline of the type including a boring bar for holding a tapping tool, a body tube over said boring bar and secured to said boring bar to allow rotation of said boring bar relative to said body tube, a feed tube over said body tube, means for allowing said feed tube to advance relative to said body tube, means for rotating said boring bar, the improvement comprising:

a clutch including a clutch disc secured to said boring bar to rotate therewith, a feed adjustment nut threadably mounted on said feed tube, a clutch member secured to said feed tube allowing axial movement of said clutch member relative to said feed tube, a biasing member positioned between said feed adjustment nut and said clutch member, a friction disc positioned between said clutch disc and said clutch member, said clutch disc including a first face abutting said friction disc, said clutch member including a first face abutting said friction disc, said first face of said clutch disc and said first face of clutch member each including means for providing a high friction surface.

2. The improvement set forth in claim 1 wherein said high friction means comprises serrations in said first face of said clutch disc and said first face of said clutch member.

3. The improvement set forth in claim 2 wherein said serrations are defined by approximately ⅛ inch wide radial cuts in said first face of said clutch disc and said first face of said clutch member.

4. The improvement set forth in claim 1 wherein said friction disc comprises organic metal impregnated material.

5. The improvement set forth in claim 1 further comprising a biasing spring between said clutch member and said feed adjustment nut.

6. A drilling machine for tapping a high pressure pipeline, comprising:
 a boring bar;
 means for attaching a tool to said boring bar;
 a body tube, said boring bar being positioned in said body tube;
 a feed tube, said body tube being positioned in said feed tube;
 means for coupling said feed tube and said body tube allowing rotation of said feed tube relative to said body tube and axial advancement relative to said body tube; and
 means for coupling said boring bar and said feed tube for rotating said feed tube at a different rate than said boring bar, said coupling means including a clutch disc rigidly secured to said boring bar, a clutch member secured to said feed tube, a feed adjustment nut threadably attached to said feed tube, and a friction disc between said clutch disc and said clutch member, said clutch disc and said clutch member including high friction surfaces engaging said friction disc.

7. The drilling machine as claimed in claim 6 wherein said friction disc comprises organic metal impregnated material.

8. The drilling machine claimed in claim 6 wherein said high friction surfaces comprise serrated surfaces.

9. The drilling machine claimed in claim 8 wherein said serrated surfaces are defined by approximately ⅛ inch wide radial cuts in said high friction surfaces.

10. The drilling machine claimed in claim 6 further comprising means for biasing said clutch member into said friction disc, said biasing means positioned between said feed nut and said clutch member.

11. The combination comprising:
 a boring bar;
 means for attaching a tool for tapping a high pressure pipeline to said boring bar;
 a body tube, said boring bar extending through and being rotatable relative to said body tube;
 an internally threaded feed tube, said body tube being threadably mounted in said feed tube;
 a clutch mechanically coupling said boring bar and said feed tube, said clutch including a clutch disc secured to said boring bar, a feed adjustment nut threadably mounted on said feed tube, a clutch member secured to said feed tube between said feed adjustment nut and said clutch disc, a friction disc of organic metal impregnated material between said clutch disc and said clutch member, said clutch disc including a surface engaging said friction disc, said clutch disc surface including serrations, said clutch member including a surface engaging said friction disc, said clutch member surface including serrations and means for biasing said clutch member into said friction disc.

* * * * *